United States Patent
O'Mahony

(10) Patent No.: US 8,457,125 B2
(45) Date of Patent: Jun. 4, 2013

(54) G.HN NETWORK NODE AND METHOD FOR OPERATING A G.HN NETWORK NODE IN THE PRESENCE OF A HOMEPLUG NETWORK

(75) Inventor: Barry A. O'Mahony, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 12/862,569

(22) Filed: Aug. 24, 2010

(65) Prior Publication Data

US 2012/0051361 A1    Mar. 1, 2012

(51) Int. Cl.
*H04L 12/28* (2006.01)
(52) U.S. Cl.
USPC .......................................... 370/389; 370/401
(58) Field of Classification Search
USPC ................. 370/252, 254, 255, 278, 282, 328, 370/338, 389, 392, 401
See application file for complete search history.

(56) References Cited

U.S. PATENT DOCUMENTS

| 7,388,850 | B2* | 6/2008 | Ochi et al. | 370/331 |
| 2007/0025266 | A1* | 2/2007 | Riedel et al. | 370/252 |
| 2007/0025386 | A1* | 2/2007 | Riedel et al. | 370/445 |
| 2008/0112320 | A1* | 5/2008 | van Willigenburg | 370/235 |
| 2010/0074263 | A1* | 3/2010 | Bry et al. | 370/401 |
| 2010/0272010 | A1* | 10/2010 | Hicks, III | 370/328 |
| 2010/0272192 | A1* | 10/2010 | Varadarajan et al. | 375/257 |

\* cited by examiner

*Primary Examiner* — Hong Cho
(74) *Attorney, Agent, or Firm* — Schwegman, Lundberg & Woessner, P.A.; Gregory J. Gorrie

(57) ABSTRACT

Embodiments of a G.hn network node and method for coexistence between G.hn network nodes and HomePlug nodes are generally described herein. In some embodiments, a G.hn network node transmits an additional preamble and header prepended to G.hn transmissions. The additional preamble and header are configured to be readable by HomePlug nodes and cause the HomePlug nodes to refrain from transmitting during the G.hn transmissions.

24 Claims, 3 Drawing Sheets

WIRELINE NETWORK

G.HN NETWORK NODE AND METHOD FOR OPERATING A G.HN NETWORK NODE IN THE PRESENCE OF A HOMEPLUG NETWORK

TECHNICAL FIELD

Embodiments pertain to home-network technology, powerline communications and powerline networking. Some embodiments relate to HomePlug technology. Some embodiments relate to the G.hn networks that operate in accordance with one of the International Telecommunication Union (ITU-T) specifications, such as the G.9960 specification, Approved Oct. 9, 2009.

BACKGROUND

The HomePlug 1.0 standard provides for high-speed communications on a wired medium (e.g., powerlines and coaxial cables) using orthogonal frequency division multiplexed (OFDM) signals and carrier-sense multiple access with collision avoidance (CSMA/CA). HomePlug Audio/Video (HPAV) is a next generation of this powerline networking technology that provides for broadband high-quality multi-stream entertainment-oriented networking over a wired medium. HPAV networks use a central coordinator (CCo) to coordinate activities within an HPAV network including allocating time for CSMA and time-division multiple access (TDMA) transmissions.

The ITU-T G.9960 standard, commonly referred to as G.hn, also provides for broadband communications over a wired medium using OFDM signals. One issue is that HomePlug nodes and G.hn network nodes operating on the same wired medium may interfere with each other. To prevent G.hn network nodes and HomePlug nodes from interfering with each other, a frequency division multiplexing technique has been conventionally used to restrict signals from G.hn network nodes from the frequency band utilized by the HomePlug nodes. The HomePlug nodes however are configured to utilize a 2-28 MHZ frequency band, which is considered a lower-attenuation and lower noise region of the spectrum that is available on a powerline channel. As a result, G.hn network nodes are sometimes limited to using higher-attenuation and higher-noise regions of the available spectrum resulting in reduced performance for a G.hn network.

Thus, there are general needs for a methods and devices that provide a coexistence mechanism for HomePlug networks and G.hn networks to allow G.hn network nodes and HomePlug nodes to operate within the same frequency spectrum.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
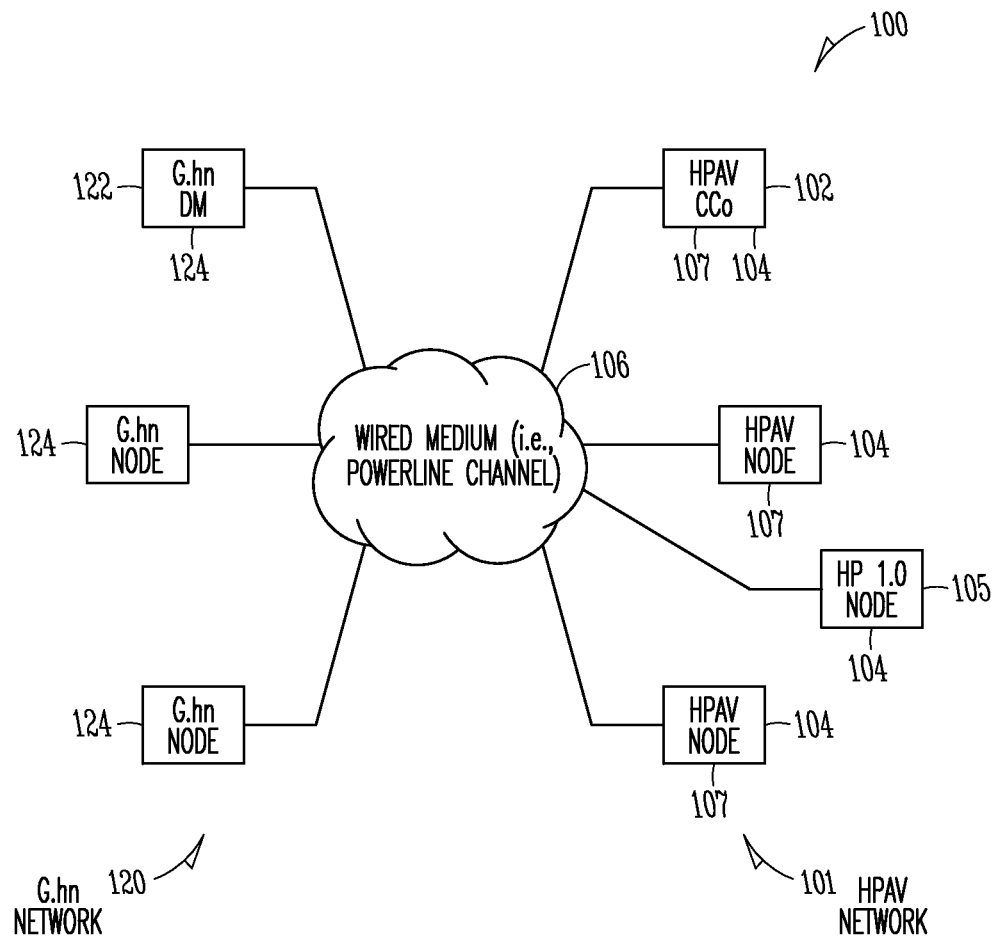
FIG. 1 is a wireline network in accordance with some embodiments.

FIG. 1 is a wireline network in accordance with some embodiments. The wireline network 100 may include a G.hn network 120 operating within the presence of a HomePlug network 101. The HomePlug network 101 may include one or more HomePlug nodes 104, which may include both HPAV nodes 107 and HomePlug 1.0 (HomePlug legacy) nodes 105. One of the HomePlug nodes 104 may be a HomePlug central coordinator (CCo) 102 that may coordinate the operations of the HomePlug network 101. In some embodiments, HomePlug network 101 may be an HPAV network.

The G.hn network 120 may include one or more G.hn network nodes 124. One of the G.hn network nodes 124 may be a G.hn network domain master (DM) 122 that may coordinate the operations of the G.hn network 120.

As illustrated in FIG. 1, the G.hn network 120 and the HomePlug network 101 may operate over a shared wired medium 106. In accordance with embodiments, to enable coexistence between the G.hn network 120 and the HomePlug network 101 and to allow the G.hn network 120 and the HomePlug network 101 to share the same frequency spectrum, a G.hn network node 124 may be configured to prepend an additional preamble and frame-control header to transmissions by the G.hn network node 124. The additional preamble and header may be readable by the HomePlug nodes 104 (i.e., both HPAV nodes 107 and HP 1.0 nodes 105) to cause the HomePlug nodes 104 to refrain from transmitting during the transmissions of the G.hn network node 124. The HomePlug-readable preamble and frame control header taken together may also be referred to as a delimiter. These embodiments are described in more detail below.

In some embodiments, a G.hn network node 124 may be configured to detect the presence of one or more HomePlug nodes 104 operating within the same frequency spectrum over the shared wired medium 106. In these embodiments, the prepending of the additional preamble and header that is readable by the HomePlug nodes 104 may be performed by the G.hn network node 124 in response to the detection of the one or more HomePlug nodes 104.

In these embodiments, the G.hn network nodes 124 and the HomePlug nodes 104 may communicate using OFDM signals within the same frequency spectrum on over the shared wired medium 106. The shared wired medium 106 may comprises either a powerline channel or a coaxial network, although the scope of the embodiments is not limited in this respect as other wired networks may also be suitable. The OFDM signals may comprise a plurality of closely-space subcarriers.

The additional preamble and header prepended to transmissions by a G.hn network node 124 are configured to be readable by HomePlug nodes 104. The transmissions to which the additional preamble and header are prepended to may be data unit transmissions readable by G.hn network nodes 124. These data unit transmissions may be packets that include their own G.hn preamble and G.hn header readable by the G.hn network nodes 124. The additional preamble and header readable by the HomePlug nodes 104 prepended to transmissions by a G.hn network node 124 do not need to be readable by G.hn network nodes 124 as the G.hn network nodes 124 will interpret them as noise.

In general, G.hn transmissions, including their G.hn preambles and headers are not readable by HomePlug nodes 104, and HomePlug transmissions, including their HomePlug preambles and headers are not readable by G.hn network nodes. The preambles the G.hn and HomePlug networks may use different tones and time periods and the header data format may also different. Furthermore, the OFDM modulation may also be different between the G.hn and HomePlug networks as well as their media-access control (MAC) operations. Furthermore, the G.hn and HomePlug networks may use a different forward-error correction (FEC) scheme. For example HPAV nodes 107 may use turbo codes while G.hn network nodes 124 may use a low-density parity check (LDPC) scheme.

In some embodiments, G.hn network nodes 124 may be configured to implement the ITU-T G.9960 standard. The G.hn network nodes 124 may also be configured to implement the ITU-T G.9972 standard.

Figure 2:
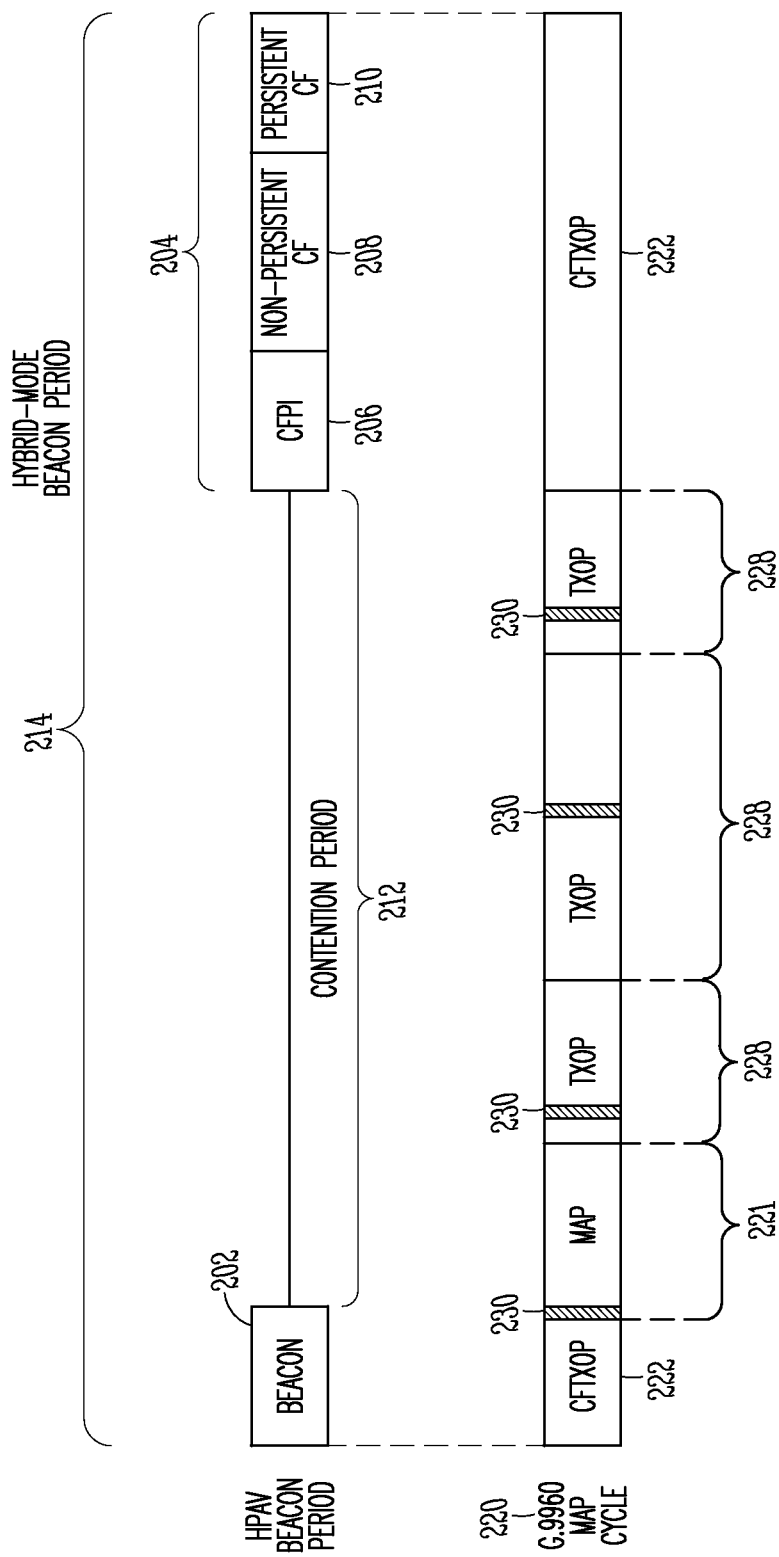
FIG. 2 illustrates a hybrid-mode beacon period of a HomePlug network and a Media-Access Period (MAP) cycle of a G.hn network in accordance with some embodiments.

FIG. 2 illustrates a hybrid-mode beacon period of a HomePlug network 101 (FIG. 1) and a MAP cycle of a G.hn network 120 (FIG. 1) in accordance with some embodiments. The hybrid-mode beacon period 214 may include a beacon transmission 202, a contention period 212, and contention (CF) free periods 204. The contention-free periods 204 include a contention-free period initiation (CFPI) 206, a non-persistent contention-free allocation period 208 and a persistent contention-free allocation period 210. The hybrid-mode beacon period 214 may be provided by an HPAV central controller 102 (FIG. 1) when operating in hybrid mode. In some embodiments, when the shared wired medium 106 is a powerline channel, the beacon period 214 may be synchronized to the AC line cycle for improved stability.

In accordance with embodiments, the MAP cycle 220 of the G.hn network 120 may include a MAP frame 226, a plurality of transmission opportunities (TXOPs) 228 and contention-free TXOPs (CFTXOPs) 222. The transmission opportunities 228 may be assigned to G.hn network nodes 124 (FIG. 1) by the G.hn network domain master 122 (FIG. 1). In some embodiments, the MAP cycle 220 may be configured in accordance with the G.9960 standard. As illustrated in FIG. 2, the additional preamble and header 230 may be prepended to transmissions by the G.hn network node 124 to cause the HomePlug nodes 104 to refrain from transmitting during the transmissions.

In some embodiments, a G.hn network node 124 (FIG. 1) may be configured to detect the regularly-repeating beacon transmission 202 over the shared wired medium 106 from the HomePlug network central coordinator 102. The regularly-repeating beacon transmission 202 indicates the presence of a HomePlug network 101. In response to detection of the regularly-repeating beacon transmission 202, the G.hn network node 124 may prepend the additional preamble and header 230 readable by HomePlug HP nodes 104 to its transmissions.

In some embodiments, the G.hn network domain master 122 (FIG. 1) may be configured to determine, based on the regularly-repeating beacon transmission 202, when the contention period 212 occurs and when the contention-free (CF) periods 204 occur within the hybrid mode beacon period 214. The G.hn network domain master 122 may indicate to other G.hn network nodes 124 of the G.hn network 120 that a HomePlug network 101 is operating on the same wired medium 106 and has been detected, The G.hn network domain master 122 may instruct the other G.hn network nodes 124 to refrain from transmitting during the contention-free periods 204 and the regularly-repeating beacon transmission 202.

In some embodiments, the G.hn network domain master 122 may be configured to refrain from scheduling transmission opportunities for the G.hn network nodes 124 during the contention-free periods 206 and during the regularly-repeating beacon transmission 202. In some embodiments, the G.hn network domain master 122 may be configured to schedule the transmission opportunities 228 for the G.hn network nodes 124 only during the contention period 212 of the hybrid-mode beacon period 214.

The G.hn network domain master 122 may also be configured to refrain from transmitting during the contention-free periods 206 and the regularly-repeating beacon transmission 202. In response to receipt of the instructing to refrain from the G.hn network domain master 122, the G.hn network nodes 124 may prepend the additional preamble and header 230 on data unit transmissions during scheduled transmission opportunities 228. In response to the additional preamble and header 230 received from a G.hn network node 124, the HomePlug nodes 104 may be configured to refrain from transmitting during the data unit transmissions of the scheduled transmission opportunities 228 of the G.hn network nodes 124.

As illustrated in FIG. 2, data unit transmissions by G.hn network nodes 124 may occur anywhere within scheduled transmission opportunities 228. The additional preamble and header 230 are prepended at the beginning of these data unit transmissions within a scheduled transmission opportunity 228.

In some embodiments, a G.hn network node 124, such as the G.hn network domain master 122, may be configured to detect one or more HomePlug nodes 104 operating within the shared wired medium 106 by receiving an out-of-band signal from the HomePlug central coordinator 102. In some of these embodiments, the out-of-band signal may transmitted over the shared wired medium 106 but outside the frequency spectrum used by both the HomePlug nodes 124 and the G.hn network nodes 124. In some other embodiments, the out-of-band signal is not transmitted over the shared wired medium 106, but may be transmitted wirelessly or over a dedicated signal line between the G.hn network domain master DM 122 and the HomePlug network central coordinator 102. In some of these embodiments, the G.hn network domain master 122 may include the functionality of the HomePlug network central coordinator 102.

In some embodiments, the G.hn network domain master 122 may transmit the MAP frame 226 with an additional preamble and header 230 prepended thereto. The MAP frame 226 may be transmitted directly after an occurrence of the beacon transmission 202. The additional preamble and header 230 prepended to the MAP frame 226 may be configured to be readable by the HomePlug nodes 104 to cause the HomePlug nodes 104 to refrain from transmitting during the MAP frame 226. In these embodiments, the MAP frame 226 is transmitting during the channel-available period (i.e., the contention period 212). At times within the contention period 212 when no transmission opportunities 228 are scheduled, HomePlug nodes may access the channel in accordance with a contention based technique.

In some embodiments, the contention-free periods 206 and the regularly-repeating beacon transmission 202 may be indicated by the G.hn network domain master 122 in the MAP frame 226 as contention-free transmission opportunities (CFTXOPs) 222. These CFTXOPs 222 may be assigned to null G.hn network nodes (i.e., dummy nodes) to indicate to G.hn network nodes 124 that the wired medium in unavailable (i.e., during the contention-free periods 206 and the regularly-repeating beacon transmission 202) leaving the channel available for scheduled HPAV TDMA transmissions.

The MAP frame 226 may also indicate a time-occurrence for any transmission opportunities 228 scheduled for the G.hn network nodes 124.

In some embodiments, the additional preamble and header 230 transmitted by a G.hn network node 124 are configured in accordance with a HomePlug 1.0 standard to be readable by the HomePlug nodes 104 including both HPAV nodes 107 and HomePlug 1.0 nodes 105. The additional preamble and header 230 transmitted by the G.hn network node 124 may also be configured to indicate a transmission of a highest priority level. Receipt of the additional preamble and header 230 by the HomePlug nodes 104 may cause the HomePlug nodes 104 to switch to hybrid mode operation and refrain from transmitting during a period indicated.

HomePlug 1.0 nodes 105 may be contention-only channel-access nodes configured to access the channel and transmit data only in accordance with a contention-based channel access technique, such as CSMA. HPAV nodes 107, on the other hand, may be configured to access the channel and transmit data in accordance with either a contention-based channel access technique or a TDMA technique. In some embodiments, the additional preamble and header 230 may be consistent with the HomePlug 1.0 standard as well as the TIA—1113 standard. In some embodiments, the G.hn network domain master 102 may transmit HP 1.0 end-of-frame (EOF) delimiters periodically to cause the HomePlug AV central coordinator 102 to either enter or remain in hybrid mode. In effect, these HP 1.0 signals may facilitate communications between the HPAV central coordinator 102 and the G.hn network domain master 122.

In some embodiments, the additional preamble and header 230 may be appended to the end of a transmission. In these embodiments, the detection of an EOF delimiter (at the end of the transmission) may cause an HPAV network to switch to hybrid mode operation and look for the prepended delimiters (e.g., additional preamble and header 230) at the beginning of G.hn transmissions.

In some embodiments, etiquette may be established to share the channel available time between HPAV and G.hn network. For example, the HPAV nodes 104 may be configured to not use the highest CSMA priority during that period. The G.hn network domain master 122 may use that priority for reserving time for the MAP frame 226, and time for other transmissions, such as TXOPs 228. HP 1.0 signals transmitted by the G.hn network domain master 122 may be received as noise by the other G.9960 nodes and ignored. In some embodiments, the G.hn network domain master 122 and the HPAV central coordinator 102 may be co-located in the same device.

In some embodiments, the HPAV nodes 107 may prepend an additional preamble and header to HPAV TDMA transmissions during contention-free periods 208 and 210. The additional preamble and header may be configured to be readable by HomePlug 1.0 nodes. The HomePlug 1.0 nodes may refrain from transmitting during the HPAV TDMA transmissions in response to receipt of the additional preamble and header prepended thereto. Both HP 1.0 nodes and HPAV nodes may be configured to refrain from transmitting during the beacon transmission 202. In these embodiments, HPAV nodes 107 may detect the presence of HP 1.0 nodes 105 by detecting a predetermined frame delimiter that may be used only by HP 1.0 nodes 105.

In some embodiments, during the contention period 212, HomePlug nodes 104 may contend with other HomePlug nodes 104 for access to the shared wired medium 106 also long a transmission opportunity 228 scheduled for a G.hn network node 124 does not occupy the channel. In these embodiments, HomePlug nodes 104 may determine if a transmission opportunity 228 is occupying the channel by processing the additional preamble and header 230 prepended to data unit transmissions of G.hn network nodes during scheduled transmission opportunities 228.

As illustrated in FIG. 2, the contention-free periods 204 include a contention-free period initiation CFPI 206, a non-persistent contention-free allocation period 208 and a persistent contention-free allocation period 210. During the contention-free period initiation 206, the HomePlug 1.0 nodes are configured to refrain from transmitting while the HPAV nodes may transmit. During the non-persistent contention-free allocation period 208 and the persistent contention-free allocation period 210, the HPAV may be scheduled to transmit in a contention-free (e.g., non-CSMA) mode.

In accordance with embodiments, the scheduled transmission opportunities 228 may comprise either contention-free transmission opportunities (CFTXOPs) or shared transmission opportunities (STXOPs). In these embodiments, CFTXOPs may have a fixed duration and may be allocated to a specific pair of G.hn network nodes 124. The STXOPs, on the other hand, may be shared among multiple G.hn network nodes 124. STXOPs may be divided into time slots including contention-free time-slots (CFTS) and contention-based time-slots (CBTS).

Figure 3:
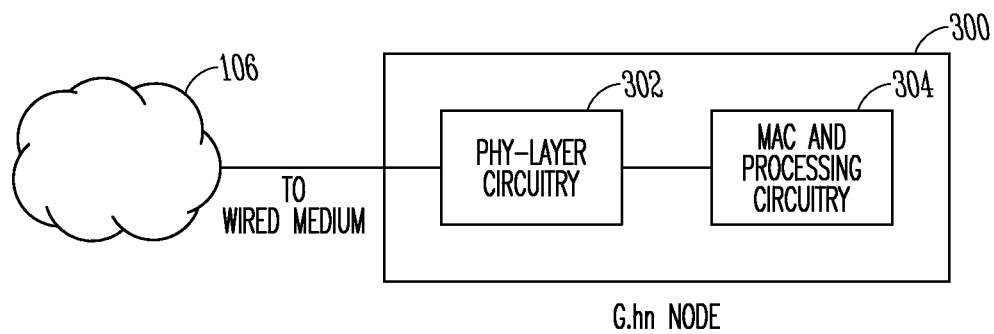
FIG. 3 is a functional block diagram of a wireline network node in accordance with some embodiments.

FIG. 3 is a functional block diagram of a G.hn network node in accordance with some embodiments. G.hn network node 300 may be suitable for use as any of G.hn network nodes 124 (FIG. 1) including G.hn network domain master 122 (FIG. 1). G.hn network node 300 may include physical (PHY) layer circuitry 302 to transmit and receive signals over the wired medium 106. G.hn network node 300 may also include media-access control and processing circuitry 304 to control access to the wired medium and perform the various operations described herein. G.hn network node 300 may also include other circuitry for interfacing with a networking device, such as a computer, to provide for communications with other network nodes.

The physical layer circuitry 302 may be configured to transmit the additional preamble and header 230 (FIG. 2) prepended to transmissions by the G.hn network node 300. The MAC and processing circuitry 304 may be configured to configure the additional preamble and header 230 to readable by HomePlug nodes 104 (FIG. 1) to cause the HomePlug nodes 104 to refrain from transmitting during the transmissions. The MAC and processing circuitry 304 may also be configured to detect one or more HomePlug nodes 104 operating within a same frequency spectrum over the shared wired medium 106 (FIG. 1) and cause the G.hn network node 300 to perform the various operations described above for coexisting with one or more HomePlug nodes 104.

Although G.hn network node 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the G.hn network node 300 may refer to one or more processes operating on one or more processing elements.

Figure 4:
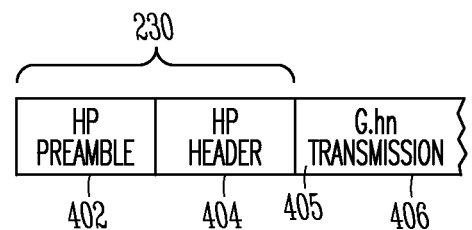
FIG. 4 illustrates an additional preamble and header prepended to G.hn transmissions in accordance with some embodiments.

FIG. 4 illustrates an additional preamble 402 and header 404 prepended to a G.hn transmission 406 in accordance with some embodiments. The additional preamble and header 230 may include preamble 404 and header 404. The preamble 404 and header 404 may be configured to be readable by HomePlug nodes 104 (FIG. 1). The preamble 404 and header 404 may be referred to as a delimiter, and the header 404 may be referred to as a frame-control (FC) information field. The preamble 402 may be form of spread spectrum signal that is used to determine the start of a delimiter. The frame-control information may be encoded using a robust turbo product code (e.g., turbo encoded) and can be detected reliably even at several dB below the noise floor. Among other things, these delimiters may be used to convey timing information that is used by the MAC of HomePlug nodes 104 to determine the availability of the medium. This preamble and header configuration is recognizable by HomePlug nodes 104, but may not be recognizable by G.hn network nodes 124 (FIG. 1).

In some embodiments, the preamble 402 may consist of seven and one-half special OFDM symbols without a cyclic-prefix (CP) added. The frame-control information of the header 404 may include four OFDM symbols and may be interleaved with an interleaver distinct from the interleaver used for payload data. Coherent BPSK is may be used for modulation of FC symbols. This preamble and header configuration is recognizable by HomePlug nodes 104, but may not be recognizable by G.hn network nodes 124 (FIG. 1).

In accordance with embodiments, since HomePlug nodes 104 do not recognize a G.hn transmission 406, the additional preamble and header 230 prepended to the G.hn transmission 406 allow a HomePlug node 104 to recognize the additional preamble and header 230 and refrain from transmitting during the G.hn transmission 406. The G.hn transmission 406 may also include a preamble and header (not separately illustrated) 405 recognizable by G.hn network nodes 124 to allow a G.hn network node 124 to synchronize with and properly receive the G.hn transmission 406. The preamble and header 405 within the G.hn transmission 406 is not recognizable by HomePlug nodes 104.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for operating a G.hn network node, the method comprising:
   including a G.hn network preamble and header in transmissions by the G.hn network node, the G.hn network preamble and header being recognizable by other G.hn network nodes;
   prepending an additional preamble and header to the transmissions by the G.hn network node, the additional preamble and header being readable by HomePlug nodes and configured by the G.hn network node to cause the HomePlug nodes to refrain from transmitting during the transmissions,
   wherein the G.hn network preamble and header are unrecomizable by the HomePlug nodes.

2. The method of claim 1 wherein the additional preamble and header transmitted by the G.hn network node are configured in accordance a HomePlug 1.0 standard to be readable by the HomePlug nodes including both HomePlug audio/video (HPAV) nodes and HomePlug 1.0,
   wherein the additional preamble and header transmitted by the G.hn network node are configured to indicate a transmission of a highest priority level, and
   wherein receipt of the additional preamble and header by the HomePlug nodes causes the HomePlug nodes to operate in a hybrid mode and refrain from transmitting during a period indicated in the header.

3. The method of claim 2 wherein the HPAV nodes are configured to prepend an additional preamble and header to HPAV time-division multiple access (TDMA) transmissions, the additional preamble and header configured to be readable by HomePlug 1.0 nodes,
   wherien the HomePlug 1.0 nodes are configured to refrain from transmitting during the HPAV TDMA transmissions in response to receipt of the additional preamble and header prepended thereto, and
   wherein both HP 1.0 nodes and HPAV nodes are configured to refrain from transmitting during a beacon transmission by a HomePlug central coordinator.

4. The method of claim 1 wherein the additional preamble and header transmitted by the G.hn network node are configured in accordance a HomePlug 1.0 standard to be readable by the HomePlug nodes including both HomePlug audio/video (HPAV) nodes and HomePlug 1.0,
   wherein the header consists of seven and one-half OFDM symbols without a cyclic-prefix (CP) and is not recognizable by the G.hn network node, and
   wherein the header is comprises frame-control information that is encoded using a robust turbo product code and is not recognizable by the G.hn network node.

5. A method for operating a G.hn network node, the method comprising:
   prepending an additional preamble and header to transmissions by the G.hn network node, the additional preamble and header being readable by HomePlug nodes to cause the HomePlug nodes to refrain from transmitting during the transmissions,
   detecting one or more HomePlug nodes operating within a same frequency spectrum over a shared wired medium,
   wherein the prepending the additional preamble and header readable by HomePlug HP nodes is performed by the G.hn network node in response to the detecting of the one or more HomePlug nodes,
   wherein the G.hn network nodes and the HomePlug nodes communicate using orthogonal frequency division multiplexed signals within the same frequency spectrum on over the shared wired medium, and
   wherein the shared wired medium comprises either a powerline channel or a coaxial network.

6. The method of claim 5 wherein the detecting comprises detecting a regularly-repeating beacon transmission over the shared wired medium from a HomePlug network central coordinator, and
   wherein the regularly-repeating beacon transmission indicates the presence of a HomePlug network.

7. The method of claim 6 wherein when the G.hn network node is a G.hn network domain master operating within a G.hn network over the shared wired medium, the method further comprises:
   determining, based on the regularly-repeating beacon transmission, when a contention period and when contention-free periods are to occur within a hybrid mode beacon period; and
   indicating to other G.hn network nodes of the G.hn network that a HomePlug network has been detected and instructing the other G.hn network nodes to refrain from transmitting during the contention-free periods and the regularly-repeating beacon transmission.

8. The method of claim 7 further comprising the G.hn network domain master:
refraining from scheduling transmission opportunities for G.hn network nodes during the contention-free periods and during the regularly-repeating beacon transmission; and
scheduling the transmission opportunities for the G.hn network nodes only during the contention period.

9. The method of claim 8 wherein in response to receipt of the instructing to refrain from the G.hn network domain master, the G.hn network nodes are configured to prepend the additional preamble and header on data unit transmissions during scheduled transmission opportunities, and
wherein in response to the additional preamble and header received from the G.hn network nodes, the HomePlug nodes are configured to refrain from transmitting during the data unit transmissions of the scheduled transmission opportunities.

10. The method of claim 7 further comprising:
transmitting, by the G.hn network domain master, a MAP frame with an additional preamble and header prepended thereto, the MAP frame being transmitted directly after an occurrence of the beacon transmission,
wherein the additional preamble and header prepended to the MAP frame is readable by the HomePlug nodes to cause the HomePlug nodes to refrain from transmitting during the MAP frame.

11. The method of claim 10 wherein the contention-free periods and the regularly-repeating beacon transmission are indicated by the G.hn network domain master in the MAP frame as contention-free transmission opportunities assigned to null G.hn network nodes to indicate to G.hn network nodes that the wired medium in unavailable, and
wherein the MAP frame further indicates any transmission opportunities scheduled for the G.hn network nodes.

12. The method of claim 10 wherein the MAP frame is part of a MAP cycle in accordance with a G.9960 standard.

13. The method of claim 5 wherein the detecting one or more HomePlug nodes operating within the shared wired medium comprises receiving an out-of-band signal from a HomePlug network central coordinator.

14. A G.hn network node comprising:
physical layer circuitry to transmit an additional preamble and header prepended to transmissions by the G.hn network node, the transmissions including a G.hn network preamble and header that are recognizable by other G.hn network nodes; and
processing circuitry to configure the additional preamble and header to be readable by HomePlug HP nodes to cause the HomePlug nodes to refrain from transmitting during the transmissions,
wherein the G.hn network preamble and header are unrecognizable by the HomePlug nodes.

15. A G.hn network node comprising:
physical circuitry to transmit an additional preamble and header prepended to transmissions by the G.hn network node; and
processing circuitry to configure the additional preamble and header to be readable by HomePlug HP nodes to cause the HomePlug nodes to refrain from transmitting during the transmissions,
wherein the processing circuitry is to detect one or more HomePlug nodes operating within a same frequency spectrum over a shared wired medium,
wherein the G.hn network node is configured to prepend the additional preamble and header readable by HomePlug HP nodes in response to the detection of the one or more HomePlug nodes,
wherein the G.hn network nodes and the HomePlug nodes communicate using orthogonal frequency division multiplexed signals within the same frequency spectrum on over the shared wired medium, and
wherein the shared wired medium comprises either a powerline channel or a coaxial network.

16. The G.hn network node of claim 15 wherein the processing circuitry is to detect a regularly-repeating beacon transmission over the shared wired medium from a HomePlug network central coordinator, and
wherein the regularly-repeating beacon transmission indicates the presence of a HomePlug network.

17. The G.1m network node of claim 16 wherein when the G.hn network node is a G.hn network domain master operating within a G.hn network over the shared wired medium, and
wherein the processing circuitry is configured to determine, based on the regularly-repeating beacon transmission, when a contention period and when contention-free periods are to occur within a hybrid mode beacon period, and
wherein the G.hn network domain master is configured to indicate to other G.hn network nodes of the G.hn network that a HomePlug network has been detected and instruct the other G.hn network nodes to refrain from transmitting during the contention-free periods and the regularly-repeating beacon transmission.

18. The G.hn network node of 17 wherein the G.hn network domain master is configured to:
refrain from scheduling transmission opportunities for G.hn network nodes during the contention-free periods and during the regularly-repeating beacon transmission; and
schedule the transmission opportunities for the G.hn network nodes only during the contention period.

19. The G.hn network node of claim 18 wherein in response to receipt of the instructing to refrain from the G.hn network domain master, the G.hn network nodes are configured to prepend the additional preamble and header on data unit transmissions during scheduled transmission opportunities, and
wherein in response to the additional preamble and header received from the G.hn network nodes, the HomePlug nodes are configured to refrain from transmitting during the data unit transmissions of the scheduled transmission opportunities.

20. A G.hn network domain master comprising:
circuitry to detect one or more HomePlug nodes operating within a same frequency spectrum over a shared wired medium; and
physical layer circuitry to transmit an additional preamble and header readable by the HomePlug nodes to cause the HomePlug nodes to refrain from transmitting during G.hn transmissions,
wherein the G.hn network domain master is configured to indicate to other G.hn network nodes of a G.hn network that one or more HomePlug nodes have been detected and to instruct other G.hn network nodes to refrain from transmitting at least during contention-free periods of a HomePlug network.

21. The G.hn network domain master of claim 20, wherein the circuitry is further configured to:

determine, based on the regularly-repeating beacon transmission, when a contention period and when contention-free periods are to occur within a hybrid mode beacon period; and indicate to other G.hn network nodes of the G.hn network that a HomePlug network has been detected and instructing the other G.hn network nodes to refrain from transmitting during the contention-free periods and the regularly-repeating beacon transmission.

22. The G.hn network domain master of claim 21 wherein the physical layer circuitry is configured to transmit a MAP frame with an additional preamble and header prepended thereto, the MAP frame being transmitted directly after an occurrence of the beacon transmission, and wherein the additional preamble and header prepended to the MAP frame is readable by the HomePlug nodes to cause the HomePlug nodes to refrain from transmitting during the MAP frame.

23. The G.hn network domain master of claim 22 wherein the contention-free periods and the regularly-repeating beacon transmission are indicated by the G.hn network domain master in the MAP frame as contention-free transmission opportunities assigned to null G.hn network nodes to indicate to G.hn network nodes that the wired medium in unavailable, and wherein the MAP frame further indicates any transmission opportunities scheduled for the G.hn network nodes.

24. The G.hn network domain master of claim 23 wherein the additional preamble and header are configured in accordance a HomePlug 1.0 standard to be readable by the HomePlug nodes including both HomePlug audio/video (HPAV) nodes and HomePlug 1.0, wherein the header consists of seven and one-half OFDM symbols without a cyclic-prefix (CP) and is not recognizable by a G.hn network node, and wherein the header is comprises frame-control information that is encoded using a robust turbo product code and is not recognizable by a G.hn network node.

* * * * *

UNITED STATES PATENT AND TRADEMARK OFFICE
CERTIFICATE OF CORRECTION

PATENT NO. : 8,457,125 B2  Page 1 of 1
APPLICATION NO. : 12/862569
DATED : June 4, 2013
INVENTOR(S) : Barry A. O'Mahony It is certified that error appears in the above-identified patent and that said Letters Patent is hereby corrected as shown below:

In the Claims

In column 7, line 61-62, in Claim 1, delete "unrecomizable" and insert --unrecognizable--, therefor In column 8, line 13, in Claim 3, delete "wherien" and insert --wherein--, therefor In column 9, line 58, in Claim 15, after "physical", insert --layer--, therefor In column 10, line 18, in Claim 17, delete "G.1m" and insert --G.hn--, therefor In column 10, line 32, in Claim 18, before "17", insert --claim--, therefor Signed and Sealed this
Second Day of December, 2014

Michelle K. Lee
*Deputy Director of the United States Patent and Trademark Office*